US005550918A

United States Patent [19]

Zdanov

[11] Patent Number: 5,550,918

[45] Date of Patent: Aug. 27, 1996

[54] CARRYING CASE FOR HYGIENIC TELEPHONE SHEILDS

[76] Inventor: Olga Zdanov, 84-89 Homelawn St., Jamaica, N.Y. 11432

[21] Appl. No.: 386,406

[22] Filed: Feb. 10, 1995

[51] Int. Cl.$^{6}$ .................... H04M 1/00

[52] U.S. Cl. .................... 379/452; 379/439

[58] Field of Search .................... 379/452, 439, 379/437; 224/229; 220/23.2, 23.8, 23.83, 23.86; 206/81, 84, 233

[56] References Cited

U.S. PATENT DOCUMENTS

| | | | |
|---|---|---|---|
| D. 291,306 | 8/1987 | Espinosa | 379/452 |
| 757,850 | 4/1904 | Thompson | 379/452 |
| 4,113,157 | 9/1978 | Woodbury | 224/229 |
| 4,876,715 | 10/1989 | Neubert | 379/452 |
| 4,949,377 | 8/1990 | Nishina et al. | 379/452 |
| 5,054,063 | 10/1991 | Lo et al. | 379/452 |

*Primary Examiner*—Jeffery Hofsass
*Assistant Examiner*—Jack Chiang
*Attorney, Agent, or Firm*—Felfe & Lynch

[57] ABSTRACT

A carrying case is provided for disposable or reusable telephone sanitary shields. The carrying case has a compartment for the telephone shields and a compartment or two for carrying coins or tokens for use in a public telephone. Where a reusable telephone shield is used, the compartment is provided with a raised portion which sandwiches the reusable shield between layers of disinfectant material, which disinfect the shield between uses.

18 Claims, 5 Drawing Sheets bottom

CARRYING CASE FOR HYGIENIC TELEPHONE SHEILDS

BACKGROUND OF THE INVENTION

This invention relates to hygienic shields for covering the handset of a public telephone, and more particularly to carrying cases for this product.

DESCRIPTION OF THE PRIOR ART

It is known to provide disposable or reusable sanitary covers for the handset of a telephone, such as a public telephone. Especially in larger cities, there is a possibility that the intimate contact of a prior user with a public telephone will have transferred to it some virus or bacteria which could be transferred to a subsequent user.

To avoid this, in the prior art various types of telephone handset covers or shields have been provided. See generally Lo et al., U.S. Pat. No. 5,054,063, Nishina et al., U.S. Pat. No. 4,949,377; and Espinosa U.S. Design Pat. No. 291,306, which patents are herein incorporated by reference.

The prior art does not disclose any effective method of carrying these shields prior to their application to a public telephone. U.S. Pat. No. 4,876,715 to Neubert, also incorporated by reference, teaches the use of a housing mounted alongside a public telephone. However, this housing is not portable and does not offer an individual the option of transporting it with him or her.

SUMMARY OF THE INVENTION

Accordingly, it is an object of this invention to provide a portable case for carrying hygienic telephone shields. Such a carrying case is provided with two portions, each defining a compartment. The first portion has a compartment containing the telephone shield(s) and the second compartment is configured to receive therein coins or tokens for using a public telephone. The telephone hygienic shield enclosed in the case may be a reusable telephone cover or one of a plurality of disposable telephone covers. If the reusable telephone cover is used, it may be formed of metal such as silver and the carrying compartment for the telephone shield maybe equipped with disinfecting material which disinfects the shield after each usage.

Other advantages and objects of the invention shall become clear in the specification and the scope of the invention will be articulated in the claims.

DETAILED DESCRIPTION OF THE DISCLOSURE

It is well known that public telephones are used by many people, and there is a possibility of transmission of viruses or bacteria from a first user to a second user of the same telephone. Accordingly, it has been desirable to provide telephone cover shields which are placed over the ear and/or mouth portions of the handset of a public telephone.

Figure 1:
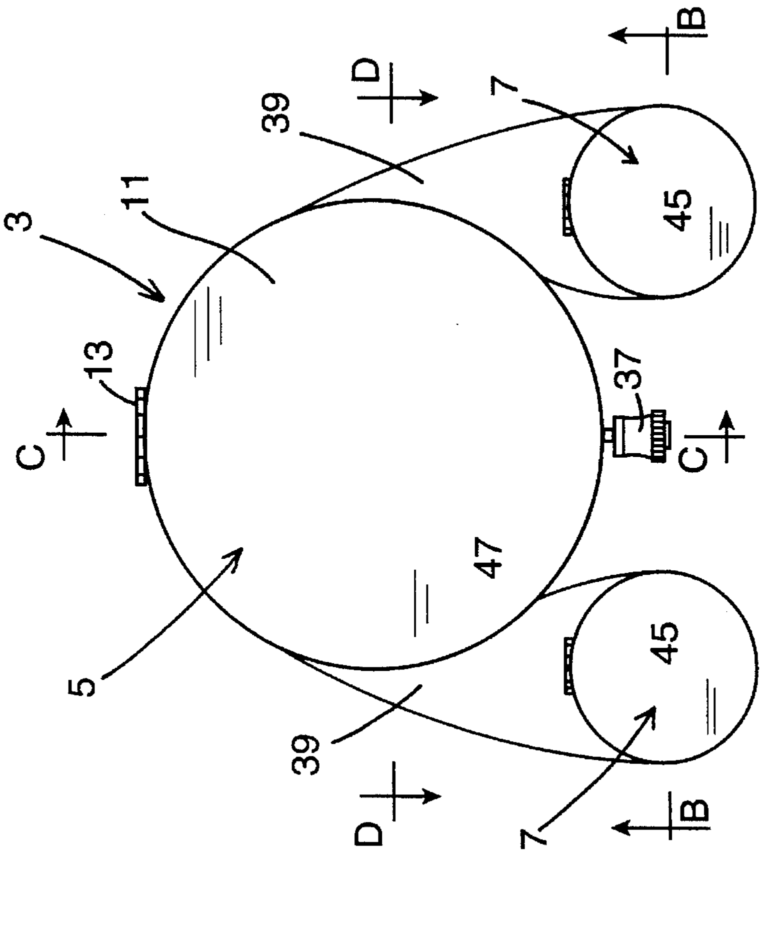
FIG. 1 shows a plan view of the carrying case of the present invention.
Figure 8:
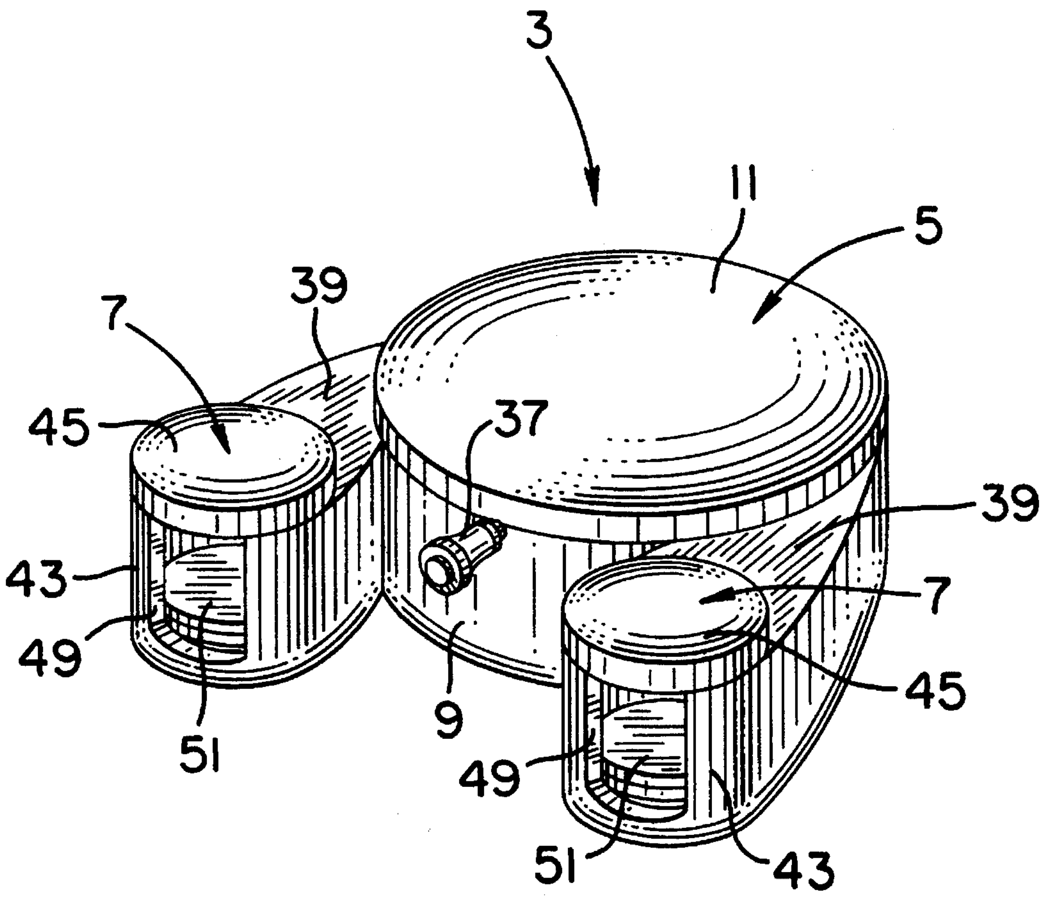
FIG. 8 is a perspective view of the carrying case of the invention.

The present invention relates to a portable case for carrying either a reusable shield or a set of disposal shields for use of public telephones. Referring to FIGS. 1 and 8, the case 3 has a first compartment portion generally indicated at 5 which is configured for the protection and transport of sanitary telephone shields or covers. This compartment 5 is connected with additional compartments, generally indicated at 7, which are configured to receive coins or tokens appropriate for use in public telephones.

Figure 7:
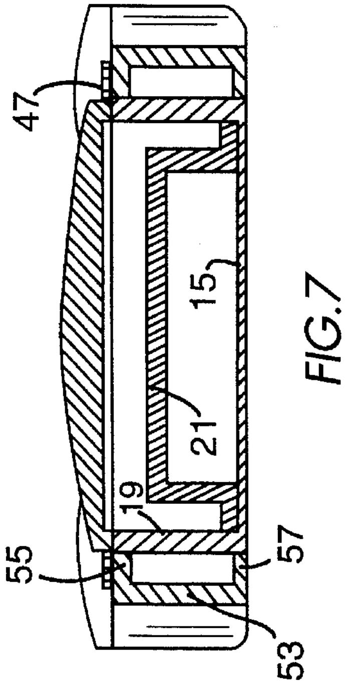
FIG. 7 is a section view taken along line D—D of FIG. 1.
Figure 7A:
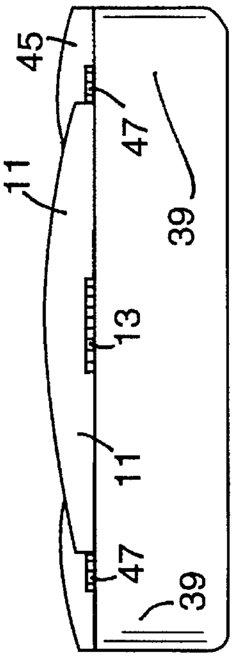
FIG. 7*a* is a rear elevational view of the case.
Figure 6:
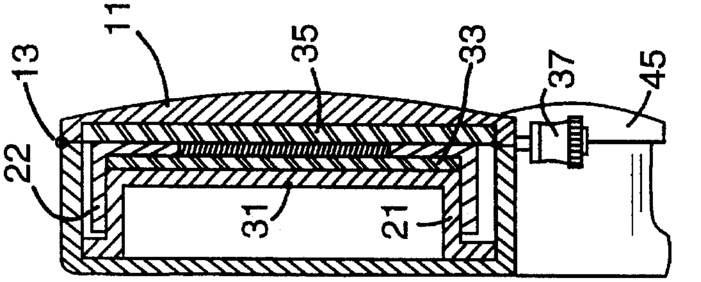
FIG. 6 is a view as in FIG. 5, but showing the placement of a reusable hygienic telephone shield in the case.
Figure 5:
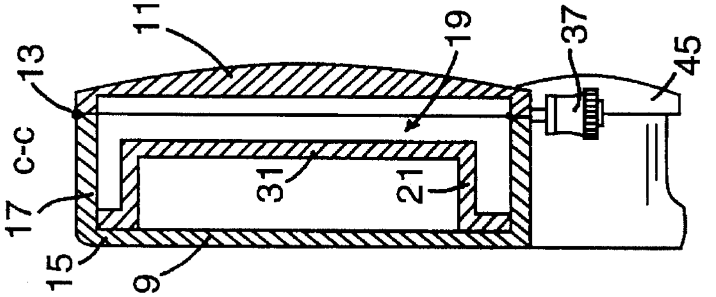
FIG. 5 is a sectional view taken along line C—C of FIG. 1.
Figure 4:
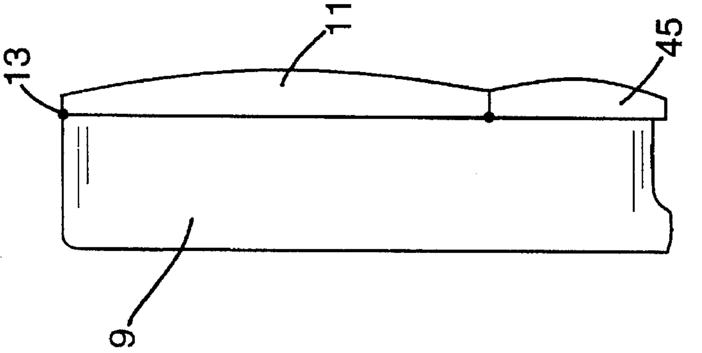
FIG. 4 is a side view of the case of the invention.

As best shown in FIGS. 5, 6, and 7, the shield compartment 5 is provided with a body portion 9 and a lid 11 which is hingedly connected to the body portion 9 by hinge 13. The body portion 9 is formed of a generally circular bottom wall 15 from which a substantially cylindrical wall 17 extends upwardly. The walls 15, 17 and lid 11 together form an interior space generally indicated at 19 which is configured to receive therein a telephone hygienic shield for a public telephone.

Figures 12, 13, 14, 15:
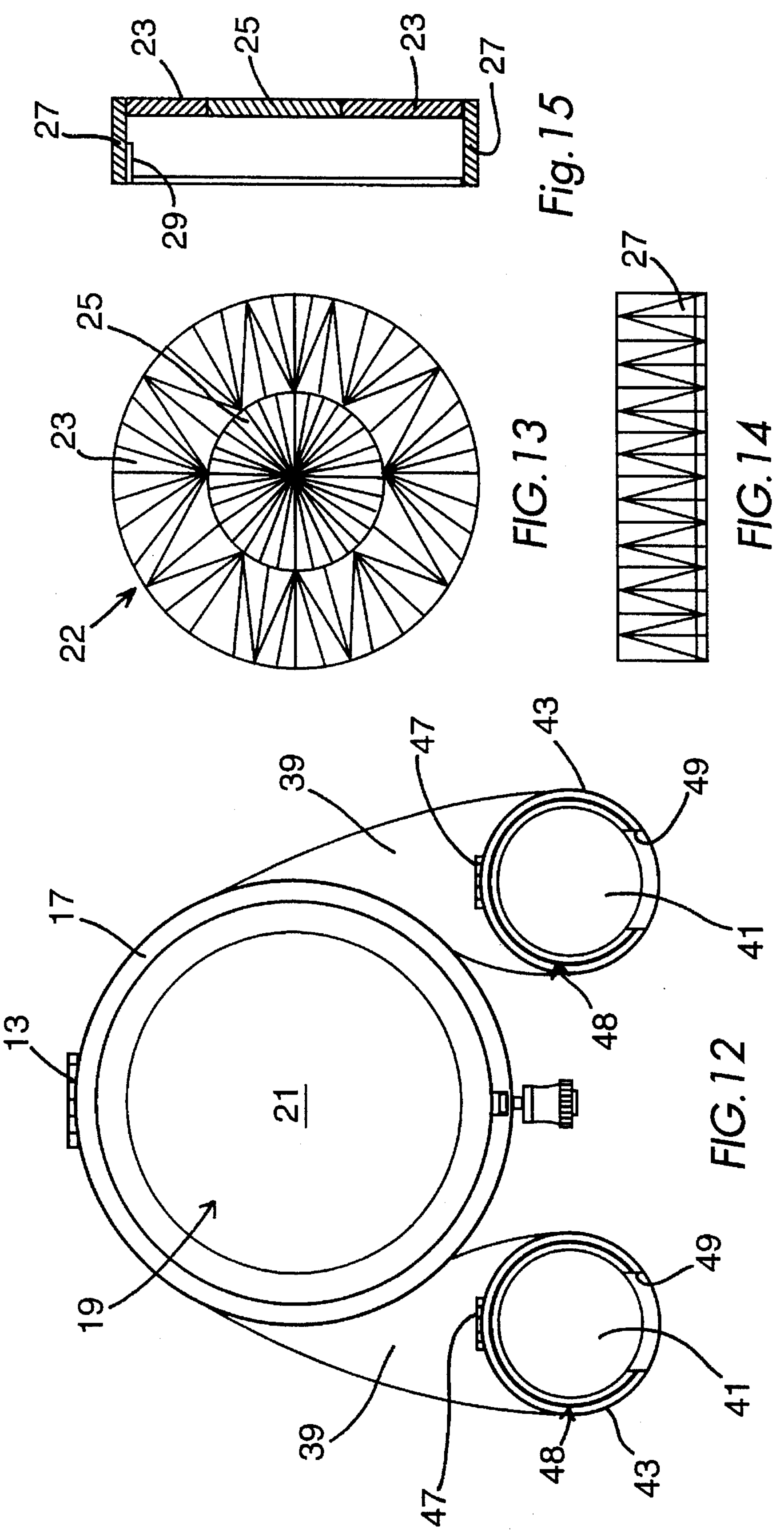
FIG. 12 is a view as in FIG. 1, but having the lid of the telephone cover and the coin-carrying portions removed.
FIG. 13 is a plan view of a metallic reusable telephone cover of this invention.
FIG. 14 is a side view of the cover of FIG. 13.
FIG. 15 is a sectional view taken along a diameter of the cover of FIG. 13.

To support the telephone shield, in the case, a raised cylindrical central portion 21 is provided to inside the space 19. This is particularly preferred when the sanitary shield being used is a reusable cover, such as the cover 22 shown in FIGS. 13–15. Such a cover 22 has a substantially circular shape to accommodate a handset having a round mouthpiece, although different shaped shields may be used where handsets are of a different shape, cover 22 has an annular top portion 23 and a central portion 25 which is formed of either wire mesh or a porous metal structure having a plurality of apertures therein to permit the user of the telephone to speak through the cover 22. For connection to the telephone, the cover 22 has cylindrical side walls 27 with adhesive or other securement means on the inner wall thereof, generally indicated at 29. As can be seen in FIGS. 13, 14 and 15, some decoration of the exterior part of the telephone cover 22 may be provided. The reusable telephone hygienic cover 22 may be formed of a variety of materials, but preferably of a metallic material. Specifically preferred is silver, or a metallic material plated with silver, due to the special hygienic qualities of this particular metal.

When stored in the case, shield 22 surrounds the raised central portion 21, and is placed between the circular raised portion 31 of the central portion and the lid 11. The raised portion 31 is provided with a disinfecting pad 33 which engages the inside surface of the hygienic cover 22, and disinfects it after usage. Similarly the lid 11 is provided with a disinfecting pad 35 which engages the outer surface of the cover 22 and disinfects the outer surface as well after usage. Such pads 33 and 35 may be pads impregnated with a disinfecting liquid, or with a dry disinfecting material, as is well known in the art.

The lid 11 of the carrying case is secured in a sealing engagement over the cylindrical wall 17 of the body 9 of the case. This sealed engagement may be released by catch 37. Catch 37 is configured as is commonly known in the art to release the lid 11 when pulled away from the front of the device, i.e., downward in FIG. 1. The latch 37 is spring biased so that it returns to its earlier latching position when released and the lid 11 has opened. The lid 11 has a slight spring biasing which causes it to pop open when the latch 37 is drawn back. This spring biasing may be accomplished simply by the shape of the lid 11, or by a spring in hinge 13. When the lid 11 is pressed downward, it latches shut again due to the biasing of latch 37.

Figure 2:
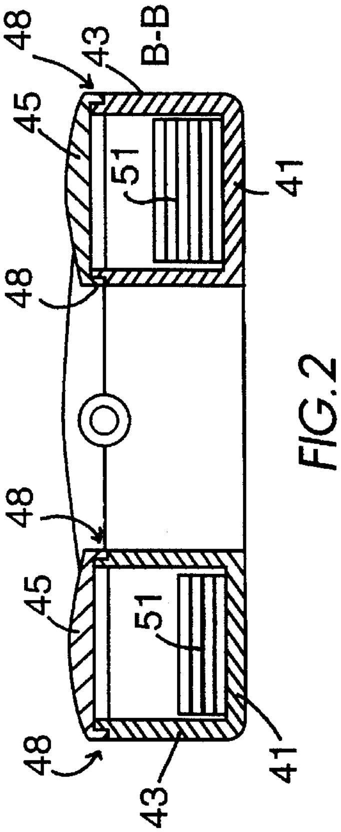
FIG. 2 shows a sectional view taken along line B—B of FIG. 1.
Figure 3:
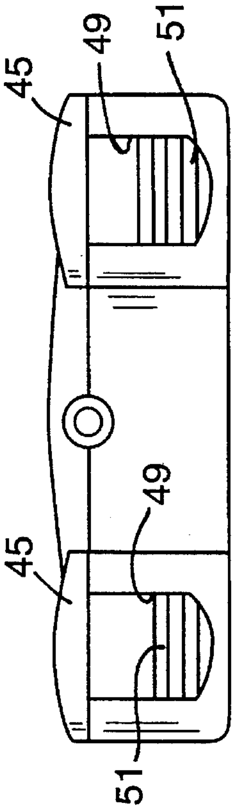
FIG. 3 is a front elevational view of the case of the invention.

Secondary compartment portions 7 of the carrying case are provided to contain tokens or coins for use in a public telephone, as is best shown in FIGS. 2 and 8. The second compartment portions 7 are supported on arms 39 extending from the first compartment portion 5. Each of these compartments 7 comprises a bottom wall portion 41 and a substantially cylindrical side wall portion 43 extending upwardly therefrom. Each compartment 7 is also provided with a lid structure 45 on hinge 48. The lid 45 is secured in engagement with the cylindrical walls 43 by an interlock portion generally indicated at 47, wherein the lid 45 fits with a slight ridged interlock over an indented cylindrical portion of the walls 43. Cylindrical walls 43 are also provided with an aperture generally indicated at 49 through which the individual carrying the case can see the coins or tokens 51 disposed within the compartments. These apertures 49 are large enough too see through, but too small to permit the egress of the coins or tokens 51.

The arms 39 which support the second compartment structure 7 are substantially tubular in construction as is best seen in FIG. 7. These arms 39 are provided with a substantially vertical outer wall 53 and top and bottom walls 55 and 57.

Figure 11:
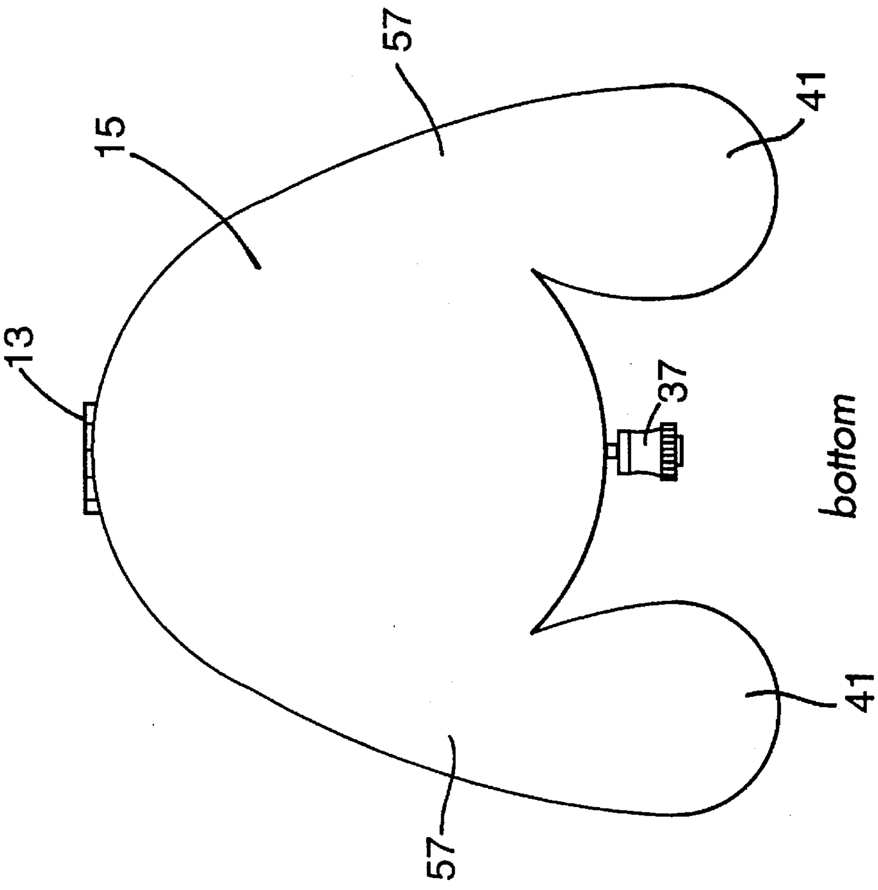
FIG. 11 is a bottom view of the case of the invention.

FIG. 11 shows a bottom view of the device, wherein it is apparent that the bottom walls 57, 15, and 41 are formed integral with each other.

Figure 10:
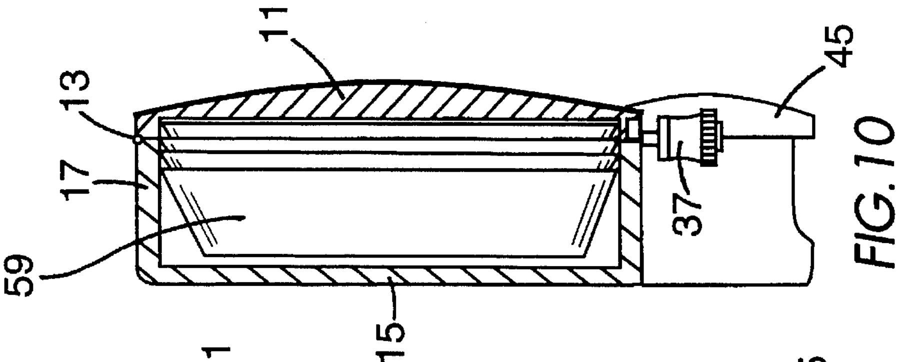
FIG. 10 is a section view as in FIG. 9 showing the disposable shields disposed inside the compartment.
Figure 9:
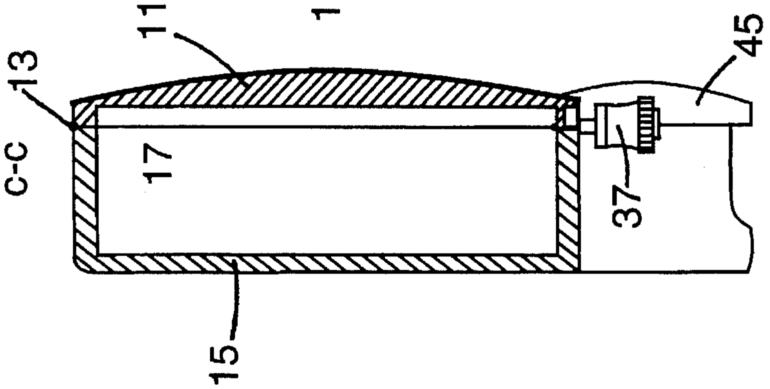
FIG. 9 is a section view as in FIG. 5, but showing an alternate embodiment for use with a plurality of disposable telephone shields.

FIGS. 9 and 10 show an alternate embodiment of the case of the invention. In this embodiment, the central portion 21 shown in FIGS. 5, 6 and 7 is not included. A plurality of disposable hygienic telephone shields formed of paper, gauze, some other fabric, or some combination thereof is accommodated in the interior of the case. Such disposable shields may be of the type disclosed in U.S. Pat. No. 5,054,063 or in U.S. Pat. No. 4,949,377, both of which patents are herein incorporated by reference. When disposable sanitary shields are used, the shields 59 can be nested one inside the other and stacked to ensure that a number will be able to fit into the case. Alternatively, a raised central portion like control portion 21 may be included in the case, with the stack of disposable shields placed over it.

The case 3 may be formed of plastic, wood, or metal, or virtually any other material.

The terms used herein should be viewed as terms of description and not of limitation, as those skilled in the art will be able to with this specification in hand, to make variations thereto without departing from the spirit of the invention herein.

What is claimed:

1. A portable case, comprising:

first and second portable case portions connected with each other;

said first case portion having a first body part and a first lid structure defining an interior space therein, said first lid structure sealing said interior space;

a sanitary telephone covering structure in said interior space, said sanitary telephone covering structure comprising an attaching portion adapted to be applied to a handset of a telephone, and a shield portion covering said handset and permitting passage of sound therethrough;

said second case portion ahving a second body part and a second lid structure defining a second interior space therein of a size permitting receiving therein a plurality of tokens or coins suitable for use in a public telephone, said second lid structure being securable in latching engagement with said second body part so as to secure the tokens or coins in said second interior space, and said second lid structure being releasable from said second body part and permitting exit of said coins or tokens from said second interior space when said second lid structure is unlatched.

2. The invention according to claim 1 and said first body part of said first case portion comprising a substantially flat bottom portion and a generally cylindrical wall portion formed integral therewith and extending upwardly therefrom.

3. The invention according to claim 2 and said first lid structure including a substantially circular lid portion hingedly connected with said wall portion and sealingly engaging therewith.

4. The invention according to claim 2 and said telephone covering structure comprising a plurality of nested disposable telephone covers.

5. The invention according to claim 2 and said telephone covering structure having a concavity, and said bottom portion having a raised central portion sized to fit into the concavity in said telephone covering means.

6. The invention according to claim 5 and said raised portion having disinfecting means thereon contacting and disinfecting the telephone covering structure.

7. The invention according to claim 6 and said first lid structure having a second disinfecting means thereon contacting and disinfecting said telephone covering structure.

8. The invention according to claim 7 and said telephone covering structure being made of metallic material.

9. The invention according to claim 8 and said telephone covering structure being made of silver.

10. The invention according to claim 8 and said telephone covering structure being plated with silver.

11. A portable case comprising a first case portion having therein at least one sanitary telephone cover, said cover having a securement portion securingly engagable with a handset of a telephone, and a shield portion covering a mouthpiece or an earpiece of the handset and hygienically isolating said handset from a user while permitting transmission of sound therethrough, said first case portion having a substantially flat first bottom portion, and a substantially cylindrical first wall portion formed integral therewith and extending upwardly therefrom and defining therewith a first interior space receiving said telephone cover, and a first lid portion hingedly supported on the first wall portion and sealingly engaging said first wall portion and sealing said interior space to protect said telephone cover; and a second case portion formed integral with said first case portion and supported thereon, said second case portion having a substantially flat second bottom portion and a substantially cylindrical second wall portion extending upwardly therefrom and defining a second interior space configured to receive therein coins or tokens suitable for use in public telephones, said second wall portion having an aperture therein of a size large enough to permit viewing of said interior space but small enough to prevent exit of the coins or tokens from the second case portion, and a second lid portion hingedly connected and securingly engageable with said second wall portion to secure said coins or tokens in said interior space of said second case portion.

12. The invention according to claim 11 and said first bottom portion having a raised portion fitting inside said cover to secure it in said first case portion.

13. The invention according to claim 11 and said first case portion containing a plurality of disposable sanitary telephone covers.

14. The invention according to claim 13 and said telephone covers being formed of paper or fabric.

15. The invention according to claim 11 and said sanitary telephone cover being of a metallic material.

16. The invention according to claim 15 and said telephone cover being formed of silver or being silver plated.

17. The invention according to claim 11 and said first lid portion having disinfecting material supported thereon and engaging and disinfecting said cover.

18. The invention according to claim 15 and said first bottom portion having a raised portion fitting inside said telephone cover and securing said telephone cover inside said first case portion, said raised portion having sterilizing material thereon contacting and disinfecting the telephone cover when in said first case portion.

* * * * *